United States Patent [19]
Kuti

[11] Patent Number: 5,139,461
[45] Date of Patent: Aug. 18, 1992

[54] COUPLER FOR AN AIRCRAFT WHEEL SPEED TRANSDUCER

[75] Inventor: Imre J. Kuti, Barberton, Ohio

[73] Assignee: Aircraft Braking Systems Corporation, Akron, Ohio

[21] Appl. No.: 599,064

[22] Filed: Oct. 17, 1990

[51] Int. Cl.$^5$ .............. F16D 3/04; F16D 3/00; F16D 3/06
[52] U.S. Cl. .............. 464/102; 464/106; 464/162
[58] Field of Search .............. 464/182, 102, 185, 106, 464/157, 51, 162, 111, 140; 403/291; 188/106 P, 181 C, 181 A, 181 T, 181 R

[56] References Cited

U.S. PATENT DOCUMENTS

| | | | |
|---|---|---|---|
| 4,045,980 | 9/1977 | Woodward et al. | 464/901 X |
| 4,090,797 | 5/1978 | Hufford et al. | 403/119 X |
| 4,440,123 | 4/1984 | Tsai | 464/102 X |
| 4,476,950 | 10/1984 | Welschof | 464/140 |
| 4,941,861 | 7/1990 | Painter | 464/102 |

FOREIGN PATENT DOCUMENTS 24032 2/1922 France .............. 464/102

Primary Examiner—Daniel P. Stodola
Assistant Examiner—Tony A. Gayoso
Attorney, Agent, or Firm—Renner, Kenner, Greive, Bobak, Taylor & Weber

[57] ABSTRACT

A coupler interconnecting a wheel speed transducer with a rotating wheel of an aircraft. A cylindrical housing has a pair of orthogonal passages extending therethrough. One of such passages communicates with a slot within one end of the housing, the slot being adapted to slidingly receive a blade from a drive cap of the wheel. The other of the passages slidingly receives a member having a hub extending therefrom for engagement with the rotatable shaft of the wheel speed transducer. Various types of possible misalignment are accommodated and corrected by the capability of the blade to slide within the slot and of the member to slide within its passage. The coupler substantially eliminates backlash and accommodates high temperature operation.

8 Claims, 1 Drawing Sheet

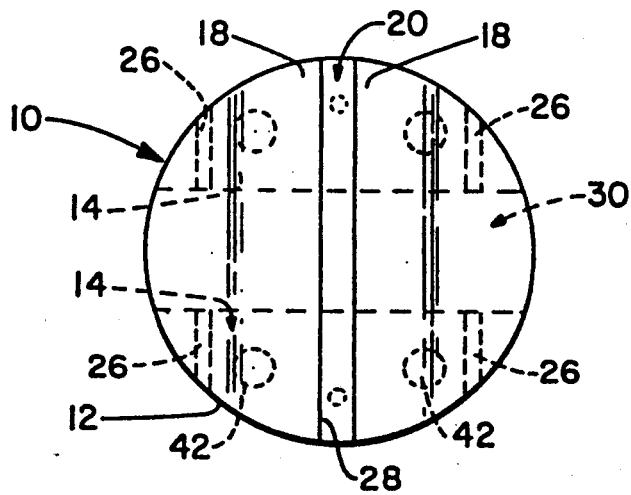
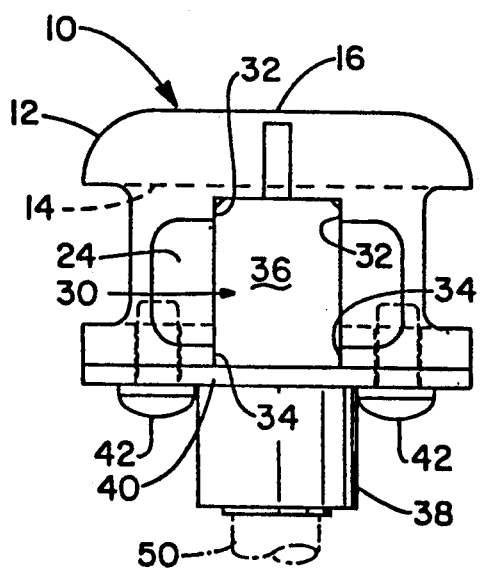
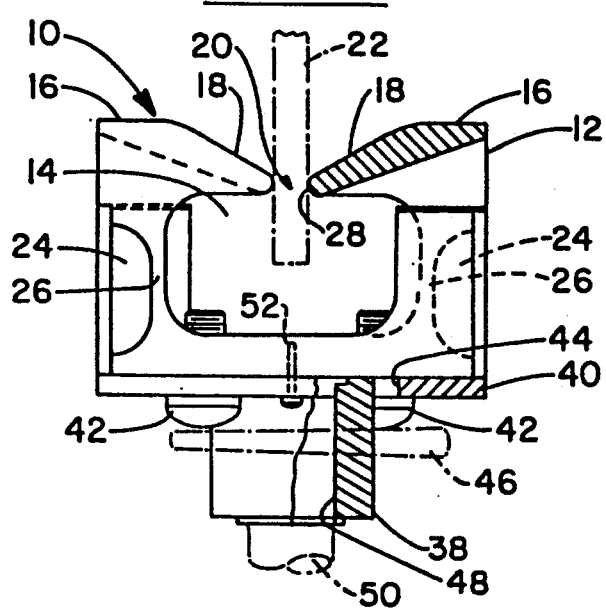
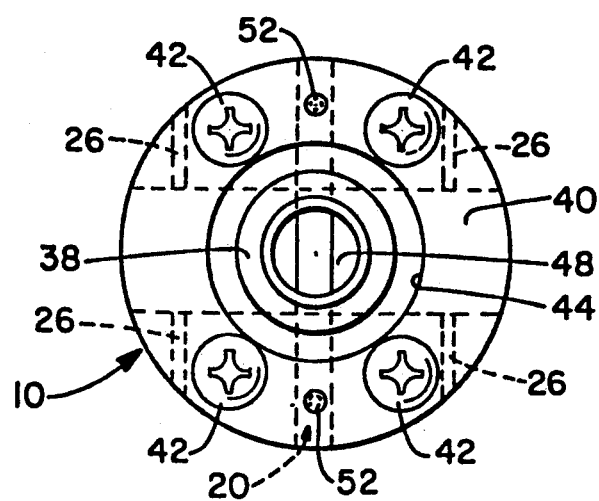

COUPLER FOR AN AIRCRAFT WHEEL SPEED TRANSDUCER

TECHNICAL FIELD

The invention herein resides in the art of coupling devices or power transmission devices and, more particularly, to a coupler for a wheel speed transducer. Specifically, the invention relates to a coupler for a wheel speed transducer intended for implementation with an aircraft.

BACKGROUND ART

It is presently known that the braking systems of many vehicles include wheel speed transducers or sensors for determining the instantaneous wheel speed of the various wheels of the vehicle. Such wheel speed transducers are particularly important in aircraft braking systems where maximum braking efficiency is desired. Known wheel speed transducers convert the rotational speed of the associated wheel to electrical signals. This wheel speed signal is then employed by brake control circuitry such as antiskid control circuitry and/or automatic brake control circuitry to control the braking activity of the vehicle.

The pulse generators of wheel speed transducers typically include one part which is fixed to the axle or aircraft frame, while another part is connected to and rotates with the associated wheel. Accordingly, a coupler is required to interconnect the rotatable member to the wheel.

Previously known couplers have been characterized by a number of shortcomings which adversely impact the operability, accuracy, and life of the coupler and transducer unit. Excessive backlash or uncoupled movement between the input and the output of the coupler has previously been the result of an inability to tightly mate the coupler portions due to necessary tolerances, clearances, and the like. This backlash problem has given rise to spurious and inaccurate signal outputs from the transducer resulting, in large part, from the fact that the input and output portions of the coupler do not constantly rotate in unison, but lead/lag conditions inherently occur.

Further, previously known couplers have been incapable of accommodating significant misalignments between the coupled input and output portions of the transducer. Such misalignments are characterized as parallel, angular, and axial, respectfully occurring when (1) the inputs and outputs are parallel but offset from each other, (2) the inputs and outputs are not parallel, but angled with respect to each other, and (3) the inputs and outputs are coaxial but inordinately spaced from each other. These misalignments can occur singularly, in various combinations, or all simultaneously.

Further, previously known couplers for wheel speed transducers have typically been undesirably large with respect to physical size and have been characterized by excessive weight, the same being most undesirable in an aircraft environment. Known couplers have also been short lived, given to excessive wear and early degradation of accuracy and consistency, resulting primarily from backlash. Additionally, known wheel speed transducer couplers are not given to ease of assembly to interconnect the transducer between the stationary axle and the rotating wheel. Prior art couplers also have ambient operating temperature limitations due to the material employed thereby.

DISCLOSURE OF INVENTION

In light of the foregoing, it is a first aspect of the invention to provide a coupler for a wheel speed transducer which is not given to excessive backlash.

Another aspect of the invention is to provide a coupler for a wheel speed transducer which substantially eliminates the spurious and inaccurate signal outputs of the wheel speed transducer previously encountered.

Yet a further aspect of the invention is the provision of a coupler for a wheel speed transducer which is capable of accommodating significant misalignements of the parallel, angular, and axial type.

Still an additional aspect of the invention is to provide a coupler for a wheel speed transducer which is small in size and light weight compared to prior art devices.

An additional aspect of the invention is the provision of a coupler or a wheel speed transducer which is long lived, not given to excessive wear.

Still another aspect of the invention is the provision of a coupler for a wheel speed sensor which is easy to assemble and interconnect with wheel drive blades known in the art.

The foregoing and other aspects of the invention which will become apparent as the detailed description proceeds are achieved by a coupler for interconnecting a wheel speed transducer to a wheel of a vehicle, comprising: a housing slidingly interconnected with the wheel; and a member slidingly received within and maintained by said housing, said member being connected to a shaft of the wheel speed transducer.

Other aspects of the invention are attained by a coupler interconnecting a wheel speed transducer to a vehicle wheel, comprising: a generally cylindrical housing having a pair of intersecting passages therein, a first of said passages adapted to slidingly receive a drive blade connected to the wheel; and an elongated member slidingly received within a second of said passages, said elongated member being connected to a rotatable shaft of said wheel speed transducer.

DESCRIPTION OF DRAWING

For a complete understanding of the objects, techniques and structure of the invention reference should be made to the following detailed description and accompanying drawing where:

FIG. 1 is a side elevational view of a wheel speed sensor coupler according to the invention;

FIG. 2 is a side elevational view partially broken away and in cross-section, of the wheel speed sensor coupler of FIG. 1, the same being rotated 90° about its axis from the illustration in FIG. 1;

FIG. 3 is a plan view of the coupler of the invention taken from a first end thereof; and FIG. 4 is a plan view of the coupler of the invention taken from a second end thereof.

BEST MODE FOR CARRYING OUT THE INVENTION

Referring now to the drawing, it can be seen that a coupler or force transmission device according to the invention is designated generally by the numeral 10. The coupler 10 comprises a substantially cylindrical housing 12 have a first rectangular passage 14 passing therethrough. The passage 14 is orthogonal to the axis of the housing 12 and symmetrical therewith, passing completely through the housing 12 from one side thereof to the other.

An end surface 16 is beveled downwardly at 18 toward the rectangular passage 14 at a slot opening or bite 20. The slot opening 20 contains a diameter of the end surface 16 and is aligned with the rectangular passage 14, communicating with such passage.

As shown in FIG. 2, a drive blade 22 of a drive cap of an aircraft wheel is received in frictional engagement by the bite of the opening 20 so as to be slidingly received therein. Accordingly, the blade 22 can slide both axially and laterally within the bite 20, and may also rotate or pivot therebetween.

As shown, a pair of recessed side areas 24 are formed within opposite sides of the cylindrical housing 12, leaving thin sidewalls 26 between the recessed areas 24 and the first rectangular passage 14. The removal of material from the recessed areas 24 not only reduces the weight of the coupler 10, but the thin sidewall 26 assists in defining the beveled surfaces 18 opposite the slot 20 as spring biased jaws for gripping the blade 22. It will be appreciated that the slot 20 is of such a width as to receive the blade 22 in frictional engagement with the sidewalls thereof. The flexibility resulting from the presence of the thin sidewall portions 26 provides a spring-like effect such that the rounded or radiused edges 28 along the sides of the slot 20 grip the blade 22 tightly enough that forces are immediately and directly transferred from the blade 22 to the coupler 10, while allowing the blade 22 to slide within the slot 20.

A second rectangular passage 30 tranverses the cylindrical housing 12 orthogonal to the first rectangular passage 14. The passage 30 defines pairs of ways 32, 34 to slidingly receive a U-shaped member 36 therein. The ways 32, 34 define a path of travel for the member 36 which symmetrically intersects the axis of the housing 12.

A hub 38 extends from the center of the member 36. As shown, an end ring or annular plate 40 is secured to an end of the cylindrical housing 12 by means of a plurality of screws 42. An annulus or center opening 44 within the ring 40 is provided to receive the hub 38 in such a manner as to limit the movement of the U-shaped member 36 within the ways 32, 34. It will be appreciated that the diameter of the annulus 44 is greater than the diameter of the hub 38 extending therethrough. Accordingly, lateral movement of the U-shaped member 36 within the second rectangular passage 30 is limited to the difference between the diameters of the hub 38 and the annulus 44.

The bore 48 is provided to receive the shaft 50 of the wheel speed transducer, such shaft being firmly connected by pin 46 to the rotatable portion of the wheel speed transducer. Accordingly, the housing 12, receiving the blade 22, serves as an input portion of the coupler 10, while the member 36, receiving the shaft 50, serves as the output portion.

To assure a proper sliding relationship of the U-shaped member 36 within the travel path defined by the ways 32, 34, adjustments are made at the time of assembling the coupler device 10. With the member 36 received within the ways 32, 34, the housing 12 is crimped by the application of force thereto transverse to the path of the ways 32, 34 until a desired sliding fit between the member 36 and ways 32, 34 is achieved. To retain that fit, a pair of drive screws 52 are then driven through the annular plate 40 and into the housing 12.

It should now be readily apparent that the coupler 10 is adapted such that the slot or bite 20 frictionally engages the blade of the drive cap of the associated aircraft wheel. The shaft 50 of the wheel speed transducer or sensor is connected to and received by the hub 38. The tight frictional fit of the blade 22 within the slot 20 provides for immediate transfer of rotational movement from the drive cap to the coupler. Similarly, the sliding engagement of the U-shaped member 36 within the ways 32, 34 provides for direct and immediate coupling of such movement to the shaft 50 of the wheel speed sensor. The U-shaped characteristic of the member 36 allows for entry of the blade 22 through the slot 20 and into the first rectangular passage 14 without interference within the member 36.

Any conceivable misalignment between the shaft 50 and blade 22 can be readily accommodated by the coupler 10. The blade 22 is free to move axially and laterally within the slot 20, as well as to rotate or pivot therein. The difference in diameters of the hub 38 and annulus 44 accommodates lateral movement of the U-shaped member 36 and attached shaft 50 in a plane orthogonal to the plane accommodating movement of the blade 22 within the slot 20. Accordingly, relative movement of the input and output portions of the coupler 10 may be achieved in each of three orthogonal axes, allowing for compensation of misalignments between the input from the drive cap blade to the output of the speed sensor shaft.

While various types of material may be used for construction of the coupler 10, it is preferred that the assembly 10 be of steel construction for strength and high temperature operation. It is further preferred that the assembly 10 be chrome plated for low friction surface characteristics and corrosion resistance.

Thus it can be seen that the objects of the invention have been satisfied by the structure presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. A coupler for interconnecting a wheel speed transducer to a wheel of a vehicle, comprising:
   a housing slidingly interconnected with a drive blade adapted for interconnection with the wheel;
   a member slidingly received within and maintained by said housing, said member being connected to a shaft adapted for communication with the wheel speed transducer; and
   wherein said housing has a pair of orthogonally intersecting passages extending therethrough, a first of said passages slidingly receiving said member, and a second of said passages slidingly receiving said blade, and an end ring received by said housing and providing a sliding surface for said member, said member having a hub extending through an opening of said end ring for mating with a shaft of the wheel speed transducer, said opening being larger than said hub to accommodate and restrict sliding of said member upon said sliding surface.

2. The coupler according to claim 1, wherein said housing has a slot therein passing from an outer end surface thereof into said second passage.

3. The coupler according to claim 2, wherein said outer end surface tapers inwardly toward said second passage uniformly along a length of said slot.

4. The coupler according to claim 3, wherein said slot is spring biased for constant sliding frictional contacting engagement with said blade.

5. The coupler according to claim 1, wherein said opening in said end ring is circular and hub of said member is of circular cross section, sliding movement of said member within said first passage being limited to a difference in diameters between said hub and opening.

6. A coupler interconnecting a wheel speed transducer to a vehicle wheel, comprising:
   a generally cylindrical housing having a pair of intersecting passages therein, a first of said passages adapted to slidingly receive a drive blade adapted for interconnection to the wheel;
   an elongated member slidingly received within a second of said passages, said elongated member being connected to a rotatable shaft adapted for interconnection with the wheel speed transducer; and
   wherein said housing has a first end having a slot passing therethrough and into said first passage, said first end having external surfaces tapering toward said slot, said slot defining a pair of jaws forming a spring biased bite upon said drive blade to slidably receive said drive blade, and said housing has a second end comprising a ring providing a surface for slidingly receiving said elongated member, said ring having an annulus receiving said shaft, said annulus having a diameter greater than a diameter of said shaft and resisting sliding movement of said elongated member within said second passage.

7. The coupler according to claim 6, wherein said shaft of said elongated member is adapted to receive a shaft of the wheel speed transducer.

8. The coupler according to claim 6, wherein said elongated member is substantially U-shaped, having a center opening for accommodating entry of said drive blade into said first passage.

* * * * *